Jan. 20, 1931.                H. H. SCHMIDT                1,789,500
                           IRRIGATION GATE VALVE
                            Filed March 2, 1929

INVENTOR
H. H. Schmidt
BY
ATTORNEY

Patented Jan. 20, 1931

1,789,500

UNITED STATES PATENT OFFICE

HENRY H. SCHMIDT, OF MERCED, CALIFORNIA

IRRIGATION GATE VALVE

Application filed March 2, 1929. Serial No. 344,016.

This invention relates to irrigating systems and particularly to one of that type in which the supply of irrigation water is confined in a pipe with valve gates at intervals positioned at various points in the length of the pipe to control the flow of water from said pipe into the irrigation ditches.

The principal object of my invention is to provide a gate and valve structure of this general character which, while very efficient, easily operated and easily installed, is of a very simple and inexpensive nature. The inexpensive and simple character of my improved gate valve not only eliminates any parts to get out of order and give trouble but enables the user to install a considerable number of these valves at no greater expense than is incurred by the installation of one of the ordinary relatively expensive and complicated type. This of course gives him a far greater control, as to the distribution of the water, than is possible with a single valve.

A further object of the invention is to provide a gate having a plurality of discharge outlets or laterals, and a closure means for said outlets arranged so that they may be all opened or closed simultaneously, or any one may be opened at the option of the operator.

These objects I accomplish by means of such structure and relative arrangement of parts as will fully appear by a perusal of the following specification and claim.

In the drawings similar characters of reference indicate corresponding parts in the several views.

Figure 1:
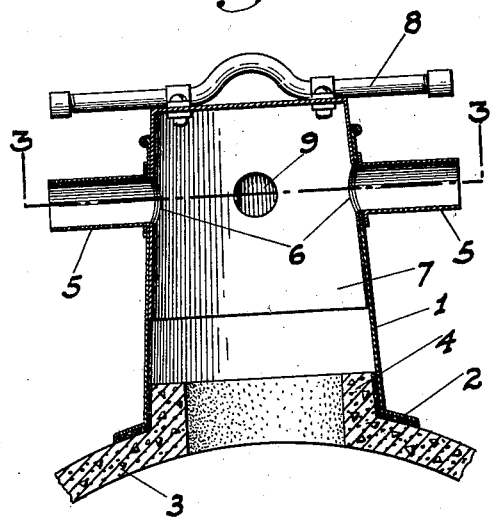
Fig. 1 is a sectional elevation of my improved gate valve structure provided with two laterals, showing the valve open.
Figure 2:
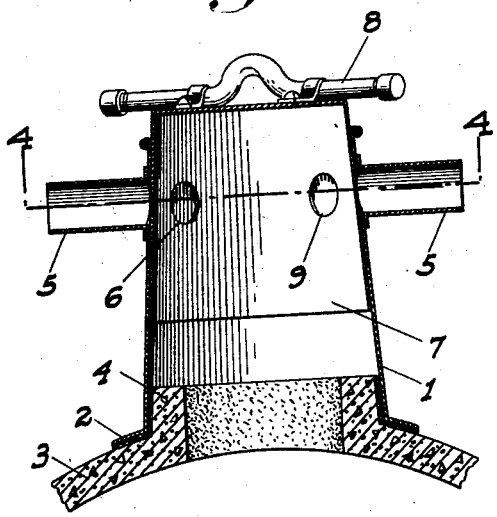
Fig. 2 is a similar view with the valve closed.
Figure 3:
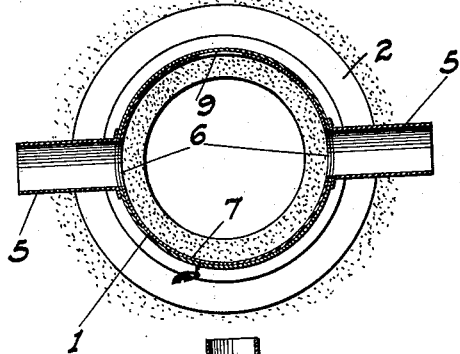
Fig. 3 is a sectional plan on the line 3—3 of Fig. 1.
Figure 4:
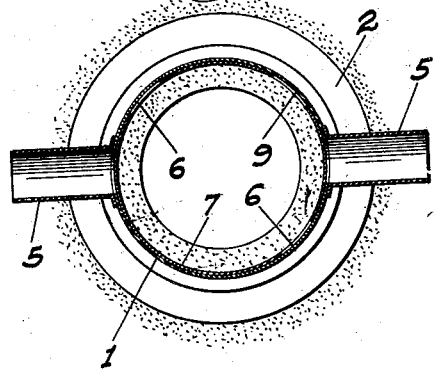
Fig. 4 is a similar view on the line 4—4 of Fig. 2.

Referring now more particularly to the characters of reference on the drawings and particularly at present to Figs. 1 to 4, the numeral 1 denotes a cylindrical valve casing and gate member having a slight converging and continuous taper from bottom to top. This member at its base is preferably provided with an outwardly extending flange 2 of suitable contour to rest on and be cemented to the main horizontal supply pipe 3. If desired this pipe may be provided with a vertical T or outlet over which the member 1 may be fitted as shown in the drawings.

The casing intermediate its ends is provided with a pair of horizontal outlet pipes 5 projecting laterally relative to the length of the supply pipe. These pipes communicate with the interior of the casing and are positioned to register with opposed openings 6 provided in a hollow valve member 7 turnably mounted in the casing and having the same taper as said casing. The valve is freely open on the bottom and closed on the top and is of such size relative to the casing that when the openings 6 lie in the horizontal plane of the pipes 5, said valve is then snugly wedged in the casing and projects some distance above the same. This wedging fit of course provides the necessary water tight fit between the parts without the necessity of employing any gaskets or the like. A suitable handle 8 is mounted on top of the valve, such as a length of pipe removably strapped on the valve and which at its ends projects over the top of the casing so that there is no chance for the valve to drop down inside the casing when its wedging grip is loosened. At the same time by removing the handle and replacing it temporarily by a shorter one, the valve may be lowered any desired distance into the casing and rotated to scrape the sides clean of any accumulation of dirt or growth.

In addition to the opposed openings 6 the valve has another opening 9 disposed centrally therebetween and on the same level and adapted to register with either at a time of the pipes 5. The diameter of the valve relative to the various side openings is such that when the opening 9 registers with either pipe 5 neither of the openings 6 will register with such pipes, so that the operator has a choice of having both pipes closed, both open or only one or the other open.

The casing and valve are preferably made of sheet metal so as to be light and inexpensive and to enable the necessary watertight fit to be had without any machining of the parts being necessary, since the natural flexibility of the sheet metal will enable the relatively movable parts to closely conform to each other when moved.

In operation to shift the valve from one position to another it is only necessary to push down on the valve until it is free of its wedging engagement with the casing, rotate the same to the desired position and pull up on the handle until the valve resumes its weding engagement with the casing. If desired the top of the valve may of course be marked to denote the positions of the various openings therein to the operator.

Figure 5:
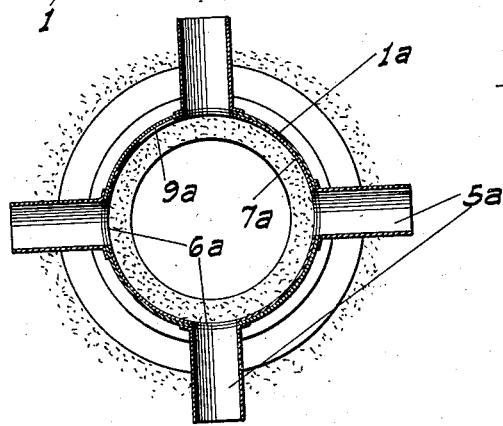
Fig. 5 is a sectional plan of a modified form of the structure with the valve open.

The above construction shows a two outlet device. A greater number of lateral outlets may however be provided in the casing according to the individual needs as illustrated in Fig. 5. In this modification the casing 1a has four equally spaced outlets 5a, and the turnable valve 7a has a like number of similarly positioned openings 6a to register with said outlets. Also if desired the single additional opening 9a may be provided to enable only one of the outlets to be selectively opened.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

An irrigation gate valve comprising an unrestrained cylindrical body adapted to be secured onto a supply pipe, the bore of the body having a converging taper toward its outer end, a hollow open bottomed valve turnable in and having the same taper as the body to wedgingly engage the same and arranged for limited axial movement inwardly of its wedging position, said body and valve having lateral openings adapted to register with each other, and means for imparting vertical and turning movement to the valve, the valve and body being of flexible material to promote water-tight wedging engagement therebetween without necessitating a machine finish of the engaging surfaces.

In testimony whereof I affix my signature.

HENRY H. SCHMIDT.